US012360082B1

(12) United States Patent
Paquette et al.

(10) Patent No.: US 12,360,082 B1
(45) Date of Patent: Jul. 15, 2025

(54) SYSTEMS AND METHODS FOR REMOTE, AUTOMATED NON-DESTRUCTIVE INSPECTION

(71) Applicant: National Technology & Engineering Solutions of Sandia, LLC, Albuquerque, NM (US)

(72) Inventors: Joshua Paquette, Albuquerque, NM (US); Dennis P. Roach, Albuquerque, NM (US); Thomas M. Rice, Albuquerque, NM (US); Clay S. Newton, Cedar Crest, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/545,780

(22) Filed: Dec. 8, 2021

Related U.S. Application Data

(60) Provisional application No. 63/123,345, filed on Dec. 9, 2020.

(51) Int. Cl.
*G01N 29/04* (2006.01)
*G01N 29/06* (2006.01)
*G05B 19/19* (2006.01)

(52) U.S. Cl.
CPC ......... *G01N 29/048* (2013.01); *G01N 29/069* (2013.01); *G05B 19/19* (2013.01); *G05B 2219/45098* (2013.01)

(58) Field of Classification Search
CPC .... G01N 29/048; G01N 29/069; G01N 29/04; G01N 29/26; G05B 19/19; G05B 2219/45098
See application file for complete search history.

(56) References Cited

U.S. PATENT DOCUMENTS

| 5,031,458 | A | * | 7/1991 | Young | G01N 29/265 73/636 |
| 5,205,174 | A | * | 4/1993 | Silverman | E04H 4/1654 376/310 |
| 7,444,876 | B2 | * | 11/2008 | Sarr | G01N 29/226 73/635 |
| 8,347,746 | B2 | * | 1/2013 | Hafenrichter | G01M 5/0016 73/866.5 |
| 2016/0114418 | A1 | * | 4/2016 | Jones | B23K 9/1087 219/124.1 |

(Continued)

*Primary Examiner* — Suman K Nath
(74) *Attorney, Agent, or Firm* — Daniel J. Jenkins

(57) ABSTRACT

An automated, inspection system that includes a robot with a closed loop control system that includes multiple Nondestructive Testing (NDI) modalities for complete through-thickness inspection of structures (e.g., wind turbine blades, aircraft, pressure vessels, pipelines, ships). The robot can be programmed either by a user or another inspection system to automatically move to a user-specified location, or a series of locations to complete a scan inspection of the area. The inspection region (size) is also automated via a user-specified input, other inspection system, or through other pre-programmed coverage patterns. Closed-loop control software allows the robot to automatically return to the location of any damaged region, identified during the inspection, so that the location can be marked and appropriate maintenance actions can be taken.

13 Claims, 3 Drawing Sheets

(56) References Cited

U.S. PATENT DOCUMENTS

| | | | |
|---|---|---|---|
| 2016/0123933 A1* | 5/2016 | Fetzer | G01N 29/28 73/634 |
| 2016/0264262 A1* | 9/2016 | Colin | B25J 5/007 |
| 2018/0079476 A1* | 3/2018 | Abdellatif | B08B 9/023 |
| 2020/0003734 A1* | 1/2020 | Troy | G01N 29/265 |
| 2021/0078177 A1* | 3/2021 | Troy | B25J 15/0019 |

* cited by examiner

SYSTEMS AND METHODS FOR REMOTE, AUTOMATED NON-DESTRUCTIVE INSPECTION

CROSS-REFERENCE TO RELATED APPLICATIONS

This application claims priority to U.S. Provisional Patent Application No. 63/123,345, entitled "SYSTEMS AND METHODS FOR REMOTE, AUTOMATED NON-DESTRUCTIVE INSPECTION," filed Dec. 9, 2020, which is incorporated herein by reference in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to inspection systems, and more particularly directed to wind turbine blade inspection systems.

BACKGROUND

Large structures are difficult to inspect due to their size and thickness in general, and because the size of a critical flaw or damage is much smaller than the scale of the structure itself. The time required for an individual inspector to search for damage in these structures is cost and time prohibitive in many cases when life safety is not involved. However, the cost of repair grows exponentially with the magnitude of the damage. Thus, finding damage at an early, small state is desirable. Unfortunately, visual damage often only occurs at a later, more consequential state, and often hides the true extent of damage within a structure. Composite structures are especially difficult to inspect as they can contain widely varying material properties, thicknesses, and attenuation of signals.

Wind energy turbines include large blades that must operate without physical defects that could affect operation or safety of the turbines. The blades must be inspected periodically, when a concern is raised from a determined design defect, or from an operational indication of that blade or similarly designed blade, or upon a visual indication of a defect. Accessibility, time to complete inspections, and cost of inspections are the two major reasons why blade inspections are almost always reduced to visual methods only. Similar situations exist for many large structures. Use of inspection methods that can detect critical subsurface damage is important, especially as structures age and in the event that overdesign conditions are experienced by the structure. Automated data analysis methods that can quickly review and fuse data from multiple non-destructive inspection (NDI) modalities are needed to avoid extensive downtime of large structures. Costly downtime for such multiple NDI often causes operators to often take calculated risks to omit periodic inspections. This, in turn, can lead to catastrophic failures. Additionally, wind turbine blades, as opposed to aircraft and rotorcraft, cannot be brought into a facility to inspect in controlled conditions. Rather, they must be accessed by an aerial lift, man basket, or rope repelling. None of these methods allow for quick, inexpensive, and repeatable deployment of advanced NDI technology. Also, wind blade structures contain composite laminates of varying thickness, sandwich structures, and adhesive bond lines, all with different flaw types and severities.

Presently, large structures, including wind turbine blades, are inspected by visual/photographic methods which look for surface demarcations as an indication of damage. These inspection techniques are limited in that they can only detect damage that manifest themselves as surface demarcations. As a result, most subsurface damage is not detected. More advanced and capable inspection methods exist and have been deployed for other industries, such as aerospace, but the combination of the equipment, the required technician, and the difficulty of access prevent these methods from being used to inspect wind turbines. In addition, photographic data is not currently reliably reviewable in automated fashion and thus, rapid damage detection is not possible and data review is subject to human factors difficulties and errors.

Currently, no automated system exists to perform a detailed inspection of large structures including wind turbine blades, when potential defects are indicated through either visual inspection or known serial defects, and with the ability to provide a composites design engineer the information needed to design a repair.

What is needed are systems and methods that can overcome these and other limitations and deficiencies of the prior art.

SUMMARY OF THE DISCLOSURE

The present disclosure is directed to an inspection system that includes a robot and processor that can inspect a location on a large, access limited structure. The processor receives data from one or more sources as to the location of a potential defect. The processor analyzes the data to determine if the location should be inspected. In an embodiment, a user may direct the inspection of a specific location. The processor then directs the robot to inspect the location and produce inspection data. The processor executes instructions stored in a non-transient medium that takes inspection data from all NDI modalities and performs data fusion to provide a real-time reasoner with the identifies, locations and severity of damage at locations on the structure.

The present disclosure is directed to an inspection system including a robot and a control system. The robot includes a mobile base comprising tread comprising vacuum slots for attaching the robot to a structure and an inspection module comprising an ultrasonic testing (UT) module for inspecting the structure and a control module. The control system includes a processor for receiving inspection instruction and executing commands to navigate the robot to one or more inspection locations on the structure and to perform UT at the one or more locations.

The present disclosure is further directed to an inspection method including analyzing data from one or more sources as to one or more locations and potential defects at the locations of a structure, determining if the one or more locations should be inspected; and directing a robot to the one or more determined locations and inspecting the one or more determined locations to produce inspection data.

An advantage of the disclosure is that the location of a particular defect can be more comprehensively characterized during the inspection process allowing for more accurate and timely maintenance decisions.

Another advantage of the disclosure is that accurate in-service inspection provided by the disclosed systems and methods can improve blade reliability, minimize blade downtime and extend blade life.

Another advantage of the disclosure is that inspections can be performed rapidly to minimize blade/turbine downtime.

Another advantage of the disclosure is that this system has the ability to detect damage that is close to its onset. Thus, it can detect damage anywhere through the thickness of the structure and smaller than that which can be detected with visual methods alone. Such early damage detection allows for either less invasive repairs or prevents the need to completely replace the structure due to the extent of damage. So, this inspection systems avoids early structural replacement and allows the structure to reach its design life or even extend its operational life.

The additional drawings disclose various embodiments of the disclosure.

DETAILED DESCRIPTION OF THE DISCLOSURE

The present disclosure is directed to systems and methods that includes a robot and a control and analysis system that includes multiple Nondestructive Testing (NDI) modalities for complete through-thickness inspection of structures, such as, but not limited to wind turbine blades, aircraft, pressure vessels, pipelines, ship structures that present a challenge to inspect due to geometry, material, access, safety, size and coverage concerns. In an embodiment, the structure is a wind turbine blade. The control and analysis system, hereinafter referred to as the C&A system, includes a processor that includes instructions embedded in a non-transient medium for controlling the robot inspection operations and analyzing inspection data. The inspection data may include pre-inspection data and in-situ obtained inspection data.

The present disclosure is also directed to systems and methods that include analyzing data from one or more sources as to the location and a potential defect, determining if the location should be inspected, directing a robot to inspect the location and produce inspection data, and determining factors as to if the location should be repaired. The systems and methods may also include determining if a determined defect location should be repaired.

Figure 1:
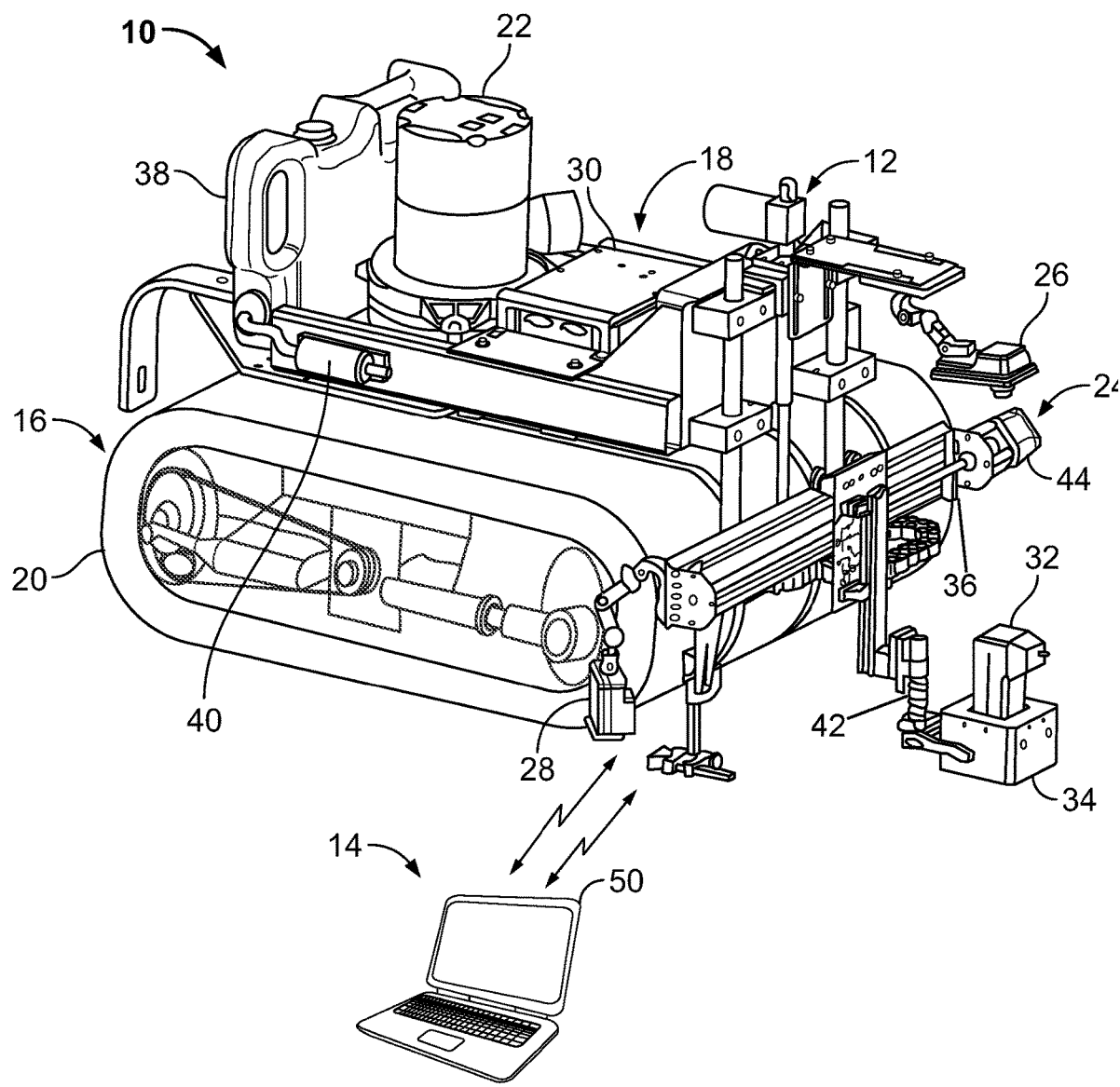
FIG. 1 illustrates an inspection system according to an embodiment of the disclosure.

FIG. 1 illustrates an inspection system 10 according to an embodiment of the disclosure. As can be seen in FIG. 1, the inspection system 10 includes an inspection robot 12 and a control system 14. The inspection robot 12 includes a mobile base 16 and an inspection operations module 18. The mobile base 16 is a vacuum track system that allows for the mobile base vacuum treads 20 to adhere to a structure surface such as a wind turbine blade 210 shown on FIG. 2. In this exemplary embodiment, a vacuum motor 22 for creating vacuum for the mobile base 16 is mounted on the inspection operations module 18, however, in other embodiments, the vacuum motor 22 may be part of or partially part of the mobile base 16.

The inspection operations module 18 includes electrical connections (not shown) for allowing electrical power to be provided to the module 18 and mobile base 16 to power inspection controls and navigation. In other embodiments, the inspection robot 12 may include battery power. The inspection operations module 18 further includes an ultrasonic inspection module 24, a first camera 26, a second camera 28 and a control module 30. The ultrasonic testing (UT) module 24 includes a UT transducer 32, a water shoe 34, a raster 36, and a water reservoir 38 and pump 40 for providing water to the water shoe 34. The raster 36 includes a spring loaded assembly 42 for engaging the water shoe 34 to follow a surface and a stepper motor 44 for rastering the UT transducer 32 in a Y-direction. The UT transducer 32 can perform a UT test of material to which the water shoe 34 is attached thereto to determine defects or flaws of the material. The defects and flaws can include delaminations, porosity, cracks, disbonds, and fiber waves. In this exemplary embodiment, the transducer 32 is a Phased Array (PA) transducer.

The first camera 26 is a video camera that provides a real time video feed to the control module 30. The first camera 26 provides information to the control module 30 so the control module 30 can navigate. The first camera 26 can also be used to store images and video of the inspection.

The second camera 28 is a video camera that provides real time video feed to the control module 30. The second camera 28 provides information to the control module 30 so the control module 30 can have the ability to see if the inspection transducer is working properly. An example is ensuring that the water shoe 34 is in contact with the surface during the scanning process. The second camera can also be used to store images and video of the inspection. In other embodiments, the second camera may additionally provide navigation.

In this exemplary embodiment, the inspection operations module 18 also includes an X-direction encoder that provides forward and reverse location to the control module to add to the navigation control data for operational navigation of the robot 12.

The control module 30 provides both navigation controls to the mobile base to control the movement of the robot 12 over a surface and inspection controls that control the operation of the UT module 24 including but not limited to the operation and rastering of the UT transducer 32. In such a manner, the control module 30 can direct the robot 12 to a location on a surface for the UT module to test.

In addition, the control module 30 operates the pump 40 to provide water from the water reservoir 38 to the water shoe 34. Note that water feed lines are not shown but are well understood in the art. In this exemplary embodiment, the control module 30 is shown as a single unit, however, in other embodiments, the control module 30 may be one or more separate units.

In other embodiment, the inspection robot may include additional visual inspection modules, Mechanical Impedance Analysis (MIA) modules, LIDAR modules, shearography modules, infrared thermography modules and other externally-applied NDI modules. Any additional modules provides data to the control module 30 to further perform structure defect analysis. In such a manner, the inspection system 10 includes multiple Nondestructive Testing (NDI) modalities for complete through-thickness and/or subsurface inspection of structures.

In yet embodiments, the robot 12 may include structure repair capability by adding one or more repair modules having one or more capabilities, such as, but not limited to surface preparation, damage removal, resin and fiber repair, bonding repair, painting and application of protective surface coatings can be controlled by the control module 30.

In an embodiment, the inspection robot may include Phased Array (PA) ultrasonic testing (UT) inspections, visual, Mechanical Impedance Analysis (MIA), LIDAR, infrared thermography and other externally-applied NDI methods capable of ascertaining defects and flaws such as, but not limited to delaminations, porosity, cracks, disbonds, and fiber waves. In an embodiment, the inspection may include visual and PA UT. In an embodiment, the robot may include blade repair capability, such as, but not limited to surface preparation, damage removal, resin and fiber repair, bonding repair, painting and application of protective surface coatings.

In this exemplary embodiment, the control system 14 includes the control module 30 and a computer 50. As is well understood, the computer 50 has a visual monitor and a keyboard for a user (not shown). In addition, the computer 50 has data entry features such as USB, CD, wireless and the like for data entry. The computer has a non-transient memory upon which instructions are encoded to operate the inspection system and analyze any inspection data obtained therefrom. In addition, the data input to the control system includes inspection location(s). The inspection location(s) data can come from visual inspection, fabrication data, maintenance databases, manufacturer recommendations, user trends assessments, and trends assessments created by previous inspections using this invention. In such a manner, the robot 12 can be programmed either by a user to automatically move to a user-specified location, or a series of locations to complete a scan/test of an inspection area. In this exemplary embodiment, the control system 14 interfaces with the control module 30 of the robot 12 via a wireless link, such as but not limited to Bluetooth®, RF. In other embodiments, the comm link may include hardwire, tethered connections. In this exemplary embodiment, the control system 14 is a closed loop control system meaning that once the robot is initiated, the control system self-guides the robot to a location and performs an inspection. In other embodiments, the inspection results may be used to initiate and perform a repair.

The inspection region (size) may be automated via a user-specified input, other inspection system, or through other pre-programmed coverage patterns. Closed-loop control software allows the robot to automatically return to the location of any damaged region, identified during the inspection, so that the location can be marked and appropriate maintenance actions can be taken. The inspection may find damage from sources such as, but not limited to, installation, lightning strike, impact, erosion, overstress, fatigue, fabrication-seeded, and environment. In an embodiment, the inspection may be used for post-repair inspections. In an embodiment, the damage may be skin laminate fracture, porosity pockets, interplay delaminations, joint disbands, corrosion, cracks, and erosion.

In an embodiment, the inspection data may include two-dimensional, color-coded, C-scan images from phased-array ultrasonics, infrared images from thermography cameras, high-fidelity surface images from optical cameras, signal response data from Mechanical Impedance Analysis devices and other data from inclusion of other NDI devices on the robot platform. Data fusion software provides a real-time reasoner that takes inspection data from all NDI modalities and automatically identifies the location and severity of damage. User-specified thresholds on damage severity can be input such that damage marking is based on the desired damage size and/or severity that should be discovered and rectified. Automated maintenance actions can be programmed into the software and submitted to an electronic maintenance program such that an evolving and optimized maintenance program can be carried out.

In an embodiment, the system and method may use Artificial Intelligence (AI) to learn from multiple inspections on similar structures so that critical areas and newly-identified (evolving) problem areas are properly identified and inspected for damage. This allows the robot to account for any aging effects on a structure and the corresponding need for escalating maintenance actions as a structure ages.

Figure 2:
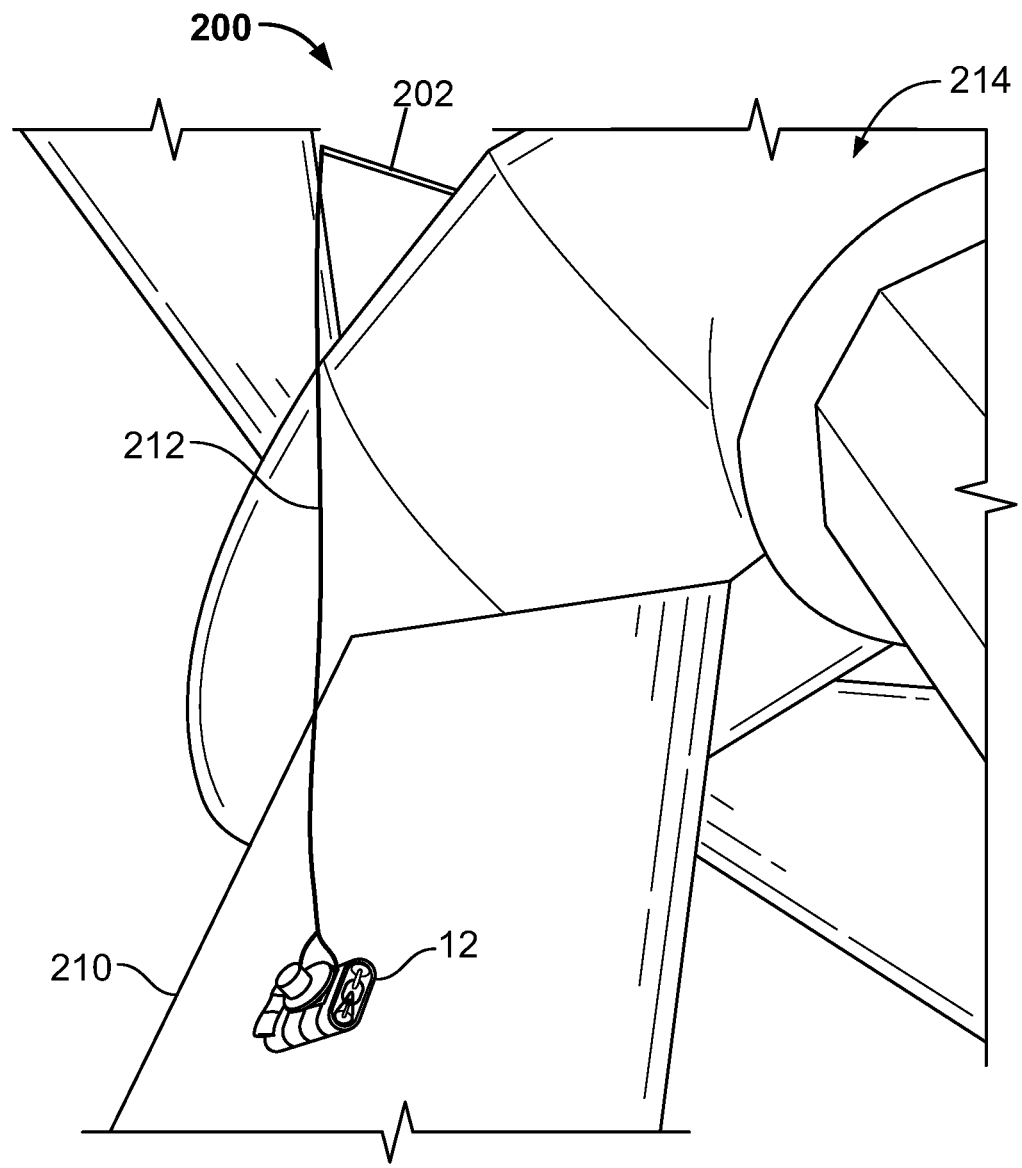
FIG. 2 illustrates an inspection system deployment system according to an embodiment of the disclosure.

FIG. 2 illustrates an inspection system deployment system 200 according to an embodiment of the disclosure. As can be seen in FIG. 2, the deployment system 200 includes a crane 202 capable of lowering an inspection robot 12 onto a structure 210 via a tether 212. In this exemplary embodiment, the structure 210 is a blade of a wind turbine 214. In this exemplary embodiment, the tether 212 provides deployment of the robot 12 as well as electricity to the robot 12. In other embodiments, the tether 212 may provide data transmission to a control system 14. Once the deployment system 200 deploys the robot 12 onto the surface of the structure 210, robot vacuum attaches the robot 12 to the surface, the tether 212 is slackened, and the robot 12 can navigate upon the surface to perform inspections of the surface. In this exemplary embodiment, the deployment system 200 is accessed via a doorway in the nacelle of the wind turbine. In other embodiments, the deployment system 200 may be permanently attached to the nacelle. In yet other embodiments, the robot is directly deployed onto the blade without a deployment system and is simply tethered to parts of the power and/or control system within the nacelle. In yet other embodiments, the robot may be disposed onto the blade from a lift, crane or other device separate from the wind turbine. In yet other embodiments, the robot may be deployed to the blade from a deployment system attached to the blade root or hub.

Figure 3:
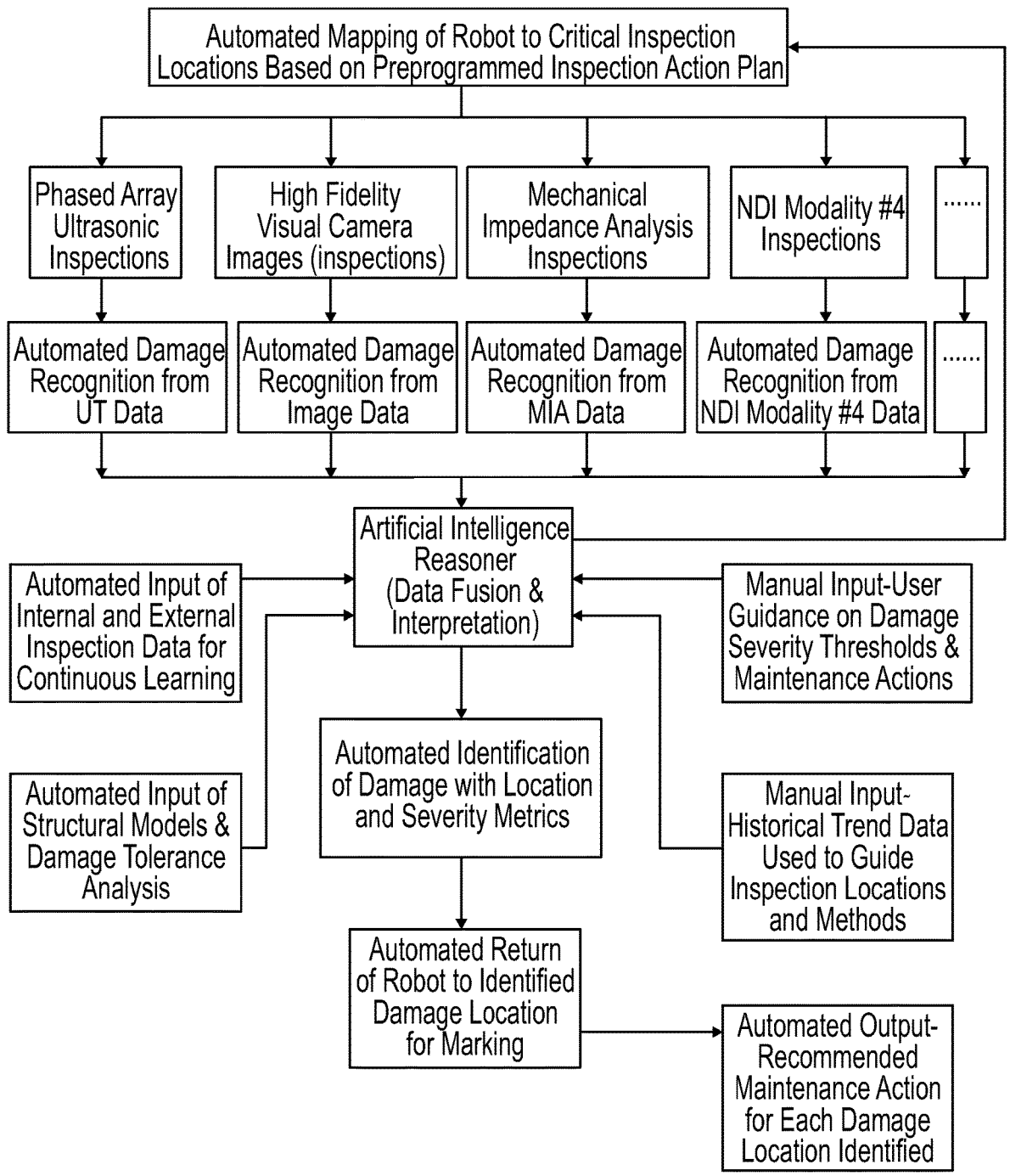
FIG. 3 illustrates an inspection methodology architecture according to an embodiment of the disclosure.

FIG. 3 illustrates the architecture or methodology for an inspection according to an embodiment of the disclosure. The following are the process steps according to this embodiment.

a) Inspection data is input into the inspection control system. The inspection data may include inspection location(s) data from visual inspection, fabrication data, maintenance databases, manufacturer recommendations, user trends assessments, and trends assessments created by previous inspections.

b) Structural model of the structure to be inspected and damage tolerance models and parameters are input into the inspection control system.

c) User guidance on damage severity thresholds and maintenance actions are input into the inspection control system.

d) Historical damage data including damage trends for the structure are input into the inspection control system to determine inspection locations and inspection methods to be used.

e) Automated mapping of robot to inspection locations are determined from the input data via data fusion and interpretation module based on a preprogrammed inspection action plan that may include artificial intelligence (AI).

f) Inspection techniques are performed at one or more suspect damage locations.

g) Real-time inspection data is provided to the inspection control system.

h) Additional data fusion and interpretation is performed to identify damage location and severity metrics.
i) Robot may mark identified locations, optional.
j) Inspection control system outputs recommended maintenance action(s) for each damage location identified.

In addition, the control system may initiate damage repair by the robot at the time of the inspection or at a later date/time.

The present disclosure is also directed to computer program product that can be executed by a computer that includes a non-transient memory having navigation and inspection instructions, whereupon execution of the instructions performs data fusion to provide a real-time reasoner that takes inspection data from all NDI modalities and automatically identifies the location and severity of damage at a location on a structure.

The present disclosure is also directed to a computer program product that includes non-transient memory having instructions, whereupon execution of the instructions performs data fusion to provide a real-time reasoner that takes inspection data from all NDI modalities and automatically identifies the location and severity of damage at a location on a structure as described above.

The disclosed methodology as discussed above is executed by a computer system that includes one or more processors that include a non-transitory medium, such as a hard drive and/or solid state drive, including instructions for analyzing data inputs that includes one or more data sets such as, but not limited to inspection data prior to inspection, inspection data and post inspection data and for determining user data outputs, such as, but not limited to damage assessment, repair data and assessment, inspection scheduling.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An inspection system, comprising:
a robot, comprising:
 a mobile base comprising tread comprising vacuum slots for attaching the robot to a structure to be inspected and allowing the robot to move across the structure;
 a vacuum motor connected to the vacuum slots for creating a vacuum that attaches the tread of the robot to the structure; and
 an inspection module comprising an ultrasonic testing (UT) module for inspecting the structure and a control module; and
a control system, comprising:
 a processor for receiving inspection instruction comprising visual inspection, fabrication data, maintenance databases, manufacturer recommendations, user trends assessments, and trends assessments created by previous inspections by the inspection system, the processor analyzing the inspection instructions to determine one or more inspection locations and executing commands determined by the analysis to navigate the robot to the one or more inspection locations on the structure and to perform UT at the one or more locations;
 wherein the processor determines the severity of damage at the one or more inspection locations on the structure.

2. The inspection system of claim 1, wherein the robot further comprises one or more video cameras for inputting video into the control system for navigation.

3. The inspection system of claim 1, wherein the robot further includes one or more cameras for visually inspecting the one or more inspection locations.

4. The inspection system of claim 1, wherein the control system determines the severity of damage at the one or more inspection locations.

5. The inspection system of claim 1, wherein the robot further comprises a repair module.

6. The inspection system of claim 1, wherein the control system is a closed loop system for operating the robot once the inspection instructions are input into the control system.

7. The inspection system of claim 1, wherein the robot is tethered to a power supply.

8. An inspection method, comprising:
analyzing data from sources as to one or more locations and potential defects at the locations of a structure, the analysis being performed by a computer;
the computer determining if the one or more locations should be inspected based at least in part on the analysis of data; and
the computer directing a mobile robot to the one or more determined locations whereby the mobile robot travels over a surface of the structure to the one or more locations and inspecting the one or more determined locations to produce inspection data while the mobile robot is attached to the surface by vacuum track system comprising vacuum slots in connectivity to a vacuum motor that creates a vacuum thereby attaching the vacuum track system to the surface;
wherein the sources are consisting essentially of visual inspection, fabrication data, maintenance databases, manufacturer recommendations, user trends assessments, and trends assessments created by previous inspections.

9. The method of claim 8, further comprising determining the severity of damage at the one or more determined locations.

10. The method of claim 9, further comprising repairing damage for locations that the severity of damage exceeds a predetermined value.

11. The method of claim 8, wherein inspecting comprises ultrasonic testing.

12. The method of claim 8, wherein the structure is a wind turbine blade.

13. The method of claim 8, wherein the method is a closed loop without operator input.

* * * * *